May 19, 1931.　　　B. F. WOODING　　　1,806,011
AUTOMATIC CONTROLLING SYSTEM FOR MOTOR VEHICLES
Filed Dec. 2, 1925
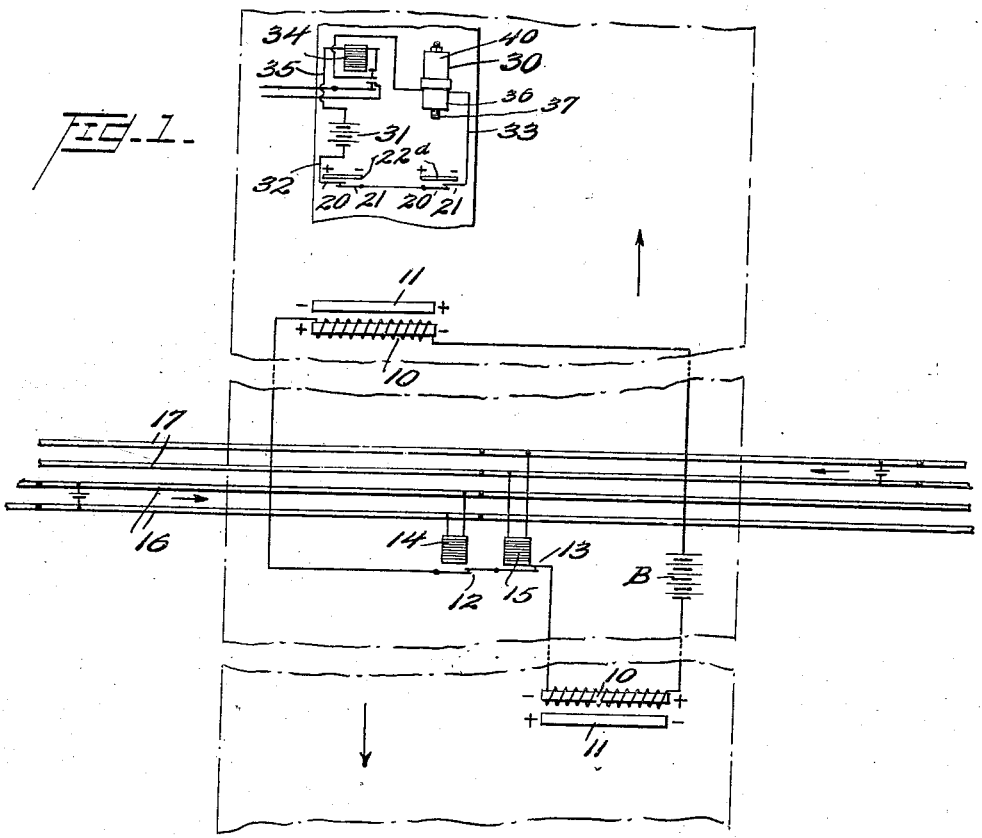
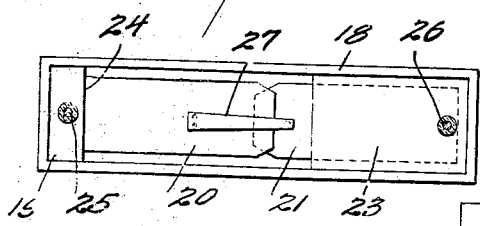
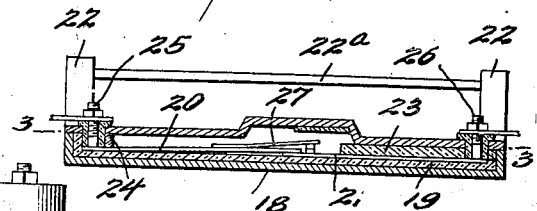
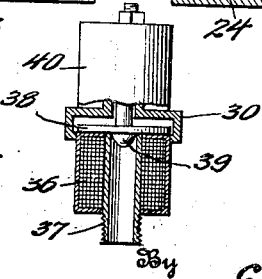
Inventor
Benjamin F. Wooding
By Edward C. Sasnett
Attorney Patented May 19, 1931

1,806,011

UNITED STATES PATENT OFFICE

BENJAMIN F. WOODING, OF MONTCLAIR, NEW JERSEY; DANIEL T. DOBYNS ADMINISTRATOR OF SAID BENJAMIN F. WOODING, DECEASED

AUTOMATIC CONTROLLING SYSTEM FOR MOTOR VEHICLES

Application filed December 2, 1925. Serial No. 72,772.

This invention relates to the automatic control of motor vehicles at highway crossings or at the intersection of a highway with a railway, either by giving an alarm on the vehicle or interrupting the ignition circuit thereof, or both, when the condition of the crossing is rendered dangerous by the approach of another vehicle on the intersecting road.

The general object of the invention is to provide a control for motor vehicles at crossing points characterized by simplicity of construction and reliability of operation.

In the preferred form of the invention the system is so constructed that a danger indication will be given upon the failure of any part thereof, thus conforming to the cardinal principle of railway signalling.

The particular nature and objects of the invention will be clearly understood from the following detailed description, and the novel features of the invention will be pointed out in the claims.

The subject matter of this application broadly is shown and described in my copending application, Serial No. 29,973.

Fig. 1 is a diagrammatic view showing a highway crossing a double track railway and a road and vehicle equipment embodying the present invention;

Fig. 2 is a longitudinal vertical sectional view through a magnetically operated circuit controller adapted to be carried by a motor vehicle.

Fig. 3 is a horizontal section taken on the line 3—3 of Figure 2; and

Fig. 4 is a sectional view through a whistle device.

As shown in Figure 1, there are located at suitable points on each side of a double track railway an electro-magnet 10 and an associated permanent magnet 11. The circuit of the electro-magnets includes in series front contacts 12 and 13 of track relays 14 and 15 connected across the track rails 16 and 17 respectively. The track relays 14 and 15 are located at the highway crossing and are connected across the track rails at the exit ends of insulated blocks of track 16 and 17 respectively. Battery B which may be located at any convenient place near the crossing is provided for energizing the electro-magnets 10. It will be understood, of course, that instead of using a single pair of magnets at each side of the crossing two or more shorter pairs could be used.

The vehicle equipment includes one or more circuit controller units shown in detail by Figures 2 and 3. Each unit consists of a shallow box 18 composed of nonmagnetic metal or other suitable nonmagnetic material. Resting on a plate 19 of insulation seated in the bottom of box 18 is a pair of thin plates 20 and 21 having their inner ends overlapping and secured at their outer ends to the plate 19. Plates 20 and 21 are composed of magnetic material, preferably pressed steel, and are normally held with their ends engaged by a permanent magnet 22$^a$ supported in any suitable manner over box 18, as by upwardly extended brackets 22 secured to the top of the box. Plate 21 is stiffened by an overlying plate of insulation 23 which extends from one end of the box over plate 21 to a point near the end thereof. Plate 20 on the other hand has a considerable degree of flexibility being clamped near its outer end against plate 19 by a bar of insulating material 24. Plate 20 has a permanent set giving it a tendency to spring up out of engagement with plate 21, but the plates are held in engagement normally by the action of the lines of force which pass through the plates from the permanent magnet 22$^a$. The external circuit is connected to plates 20 and 21 by means of binding posts 25 and 26, these posts being screwed through insulating bushings in the cover of the box, and making firm contact at their ends with the plates.

Since the controller is subject to considerable jarring and vibration during the travel of the automobile and the contact plates thereof are therefore liable to be jarred out of engagement with each, breaking the electrical circuit, I have provided means to maintain the circuit closed irrespectively of any momentary disengagement between the plates. This means, as clearly shown in Figures 2 and 3, consists of a light flexible strip 27 secured at one end to the upper face of plate 20 and having its other end extended over plate 21 and provided with a non-magnetic contact button normally engaging a similar button on plate 21. In the closed position of the controller there is a slight clearance between a greater portion of strip 27 and the underlying plate 20 so that the contact buttons of the strip 27 and plate 21 will maintain contact on slight momentary separations of the ends of the plates.

One or more of the circuit controlling elements described above may be provided on the automobile. In Figure 1, two of such controllers are indicated and these may be mounted at suitable places, as, for example, under the two running boards. As shown the controllers are in the circuit of a whistle 30, said circuit including a battery 31, conductor 32, the contacts of the two controllers in series, conductor 33, whistle 30, a stick relay 34, and conductor 35. The whistle may be of any suitable construction. As shown in Figure 4 it comprises a magnet 36 surrounding the end of a pipe 37 adapted to be connected to a suitable source of compressed air or gas, such as the exhaust from the engines; an armature disk 38 having a valve 39 normally held seated on the end of pipe 37 by a magnet 36 and a whistle 40 adapted to sound when the magnet is deenergized and valve 39 is forced from its seat by the compressed air. The stick relay 34 may control the ignition circuit, as indicated, so that this circuit will be interrupted simultaneously with the sounding of the alarm.

The roadway electro-magnets 10 are closely associated with the respective permanent magnets 11, and have their poles oppositely arranged with respect to the poles of their associated permanent magnets so that when the electro-magnets are energized they neutralize the magnetic effects of the associated permanent magnets. This is the normal condition; that is, the condition in which no train is approaching the crossing on either track. Under this condition of safety an automobile equipped with the apparatus embodying my invention can pass the roadway magnets without having its circuit controllers operated. However, if a train is approaching the crossing on either track one or the other of the track relays 14 and 15 will be deenergized and one or the other of the front contacts 12 and 13 will be opened; thus, deenergizing the roadway magnets 10 and permitting the permanent magnets to have full effect.

It will be observed from Figure 1 that the permanent magnets 11 are arranged so that they have opposite polarity with respect to the vehicle magnets 21. Thus, if a vehicle should attempt to pass a permanent magnet when its associated electro-magnet is deenergized, the lines of force from the permanent magnet on the track will neutralize the effect of the permanent magnet 21 on the vehicle and cause the contact plate 20 and its contact strip 27 to spring up out of engagement with plate 21 thereby opening the whistle circuit and causing the whistle to sound an alarm and simultaneously opening the ignition circuit. When the circuits have been thus opened they will remain open due to the opening of the front contact of stick relay 34, and in order to reform the circuits it will be necessary for the operator to reclose manually the front contact of this relay.

A preferred form only of the invention has been illustrated. Many modifications may obviously be made without altering the essential operating principles of the invention, and I therefore do not intend to limit my invention except as defined in the claims.

I claim:

1. In a vehicle control system, a permanent magnet located beneath the surface of a roadway near the intersection thereof with a second roadway, an electro-magnet associated with said permanent magnet and adapted when energized to neutralize the action thereof, means controlled by a vehicle on said second roadway for controlling the circuit of said electro-magnet, and a vehicle having an alarm actuated by said permanent magnet.

2. In a vehicle control system, a permanent magnet located beneath the surface of a highway near the intersection thereof with a railway, an electro-magnet associated with said permanent magnet and adapted when energized to neutralize the action thereof, said railway having a track circuit including a relay, and a circuit for said electro-magnet including front contacts of said relay, and a vehicle on said highway having controlling means adapted to be actuated by said permanent magnet.

3. In a vehicle control system, a motor vehicle having a circuit controller adapted to be operated inductively by a magnet located on a highway near the intersection thereof with a railway, said circuit controller comprising two strips of magnetic material having overlapping ends and a permanent magnet associated with said strips and normally holding said ends engaged, and an alarm on the vehicle controlled by said circuit controller.

4. A vehicle control system comprising a permanent magnet located in a highway near the intersection thereof with a railway, a closed track circuit including the rails of said railway and a normally energized relay, an electro-magnet in a circuit including a source of energy and the front contacts of said relay, said electro-magnet being closely associated with said permanent magnet and adapted to neutralize the effect thereof, and a vehicle on said highway having a normally closed circuit including controlling means and contacts adapted to be opened when passing over the permanent magnet when the associated electro-magnet is deenergized.

5. A motor vehicle controlling system comprising normally ineffective magnetic devices beneath the surface of a highway near the intersection thereof with a road, means governed by traffic on said road for rendering said devices effective, a vehicle on said highway having two magnetically operable circuit controllers mounted respectively on each side thereof so that at least one of said circuit controllers will be operated by said magnetic devices when the latter are effective at the time the vehicle passes thereover and vehicle controlling means actuated when either of said circuit controllers is operated.

6. In an automobile, a normally closed circuit including means to give an indication upon interruption thereof, and a magnetically operable circuit controller having contacts in said circuit biased to open position and having magnetic means normally holding said contacts closed, said circuit controller being supported on the vehicle so as to be directly and effectively influenced by suitable magnets on the roadway.

7. In an automobile, a circuit controller including normally closed contacts biased to open position and an associated permanent magnet normally holding said contacts closed, said circuit controller being supported on the vehicle so as to be effectively influenced by suitable magnets on the roadway, and means for giving an indication when said circuit is interrupted.

8. In a vehicle control system, a motor vehicle having a circuit controller adapted to be operated inductively by a magnet located in a roadway, said circuit controller comprising two strips of magnetic material having overlapping ends and a permanent magnet associated with said strips and normally holding said ends engaged.

9. In a vehicle control system, a motor vehicle having a circuit controller adapted to be operated inductively by a magnet located in a roadway, said circuit controller comprising two strips of magnetic material having overlapping ends and a permanent magnet associated with said strips and normally holding said ends engaged, and an alarm on the vehicle controlled by said circuit controller.

In testimony whereof I hereunto affix my signature.

BENJAMIN F. WOODING.